United States Patent
Cheung

(10) Patent No.: US 6,529,338 B2
(45) Date of Patent: Mar. 4, 2003

(54) ZOOM LENS ASSEMBLY WITH FOCUS ADJUSTMENT MECHANISM

(76) Inventor: Ping-Yim Cheung, House 14, Beaulieu Peninsula, 2 Yu Chui Street, Tai Lam, New Territories (HK)

( * ) Notice: Subject to any disclaimer, the term of this patent is extended or adjusted under 35 U.S.C. 154(b) by 49 days.

(21) Appl. No.: 09/774,076

(22) Filed: Jan. 31, 2001

(65) Prior Publication Data

US 2002/0114083 A1 Aug. 22, 2002

(51) Int. Cl.[7] .............................................. G02B 15/14
(52) U.S. Cl. ...................... 359/699; 359/700; 359/701
(58) Field of Search ................................. 359/694, 699, 359/700, 701, 823

(56) References Cited

U.S. PATENT DOCUMENTS

| 4,890,132 A | | 12/1989 | Hama .......................... 354/400 |
| 5,140,468 A | * | 8/1992 | Kayanuma ................... 359/696 |
| 5,373,397 A | * | 12/1994 | Satoh et al. ................. 359/699 |
| 5,777,802 A | * | 7/1998 | Koiwai et al. .............. 359/700 |
| 6,115,197 A | | 9/2000 | Funahashi .................... 359/826 |
| 6,151,171 A | | 11/2000 | Kenin et al. ................. 359/684 |

* cited by examiner

*Primary Examiner*—Ricky Mack
(74) *Attorney, Agent, or Firm*—Jacobson Holman PLLC

(57) ABSTRACT

A zoom lens assembly that couples a second lens group to a first lens group such that one cam mechanism is able to transfer both lens groups. The second lens group is further provided with a second cam mechanism that is able to provide the fine distance adjustment of the second lens group required for proper focus correction.

5 Claims, 6 Drawing Sheets

ZOOM LENS ASSEMBLY WITH FOCUS ADJUSTMENT MECHANISM

FIELD OF INVENTION

The present invention relates generally to a zoom lens apparatus and more particularly to a zoom lens apparatus having a distance adjustment mechanism for a first and a second lens group.

BACKGROUND OF INVENTION

Conventional zoom lens apparatus generally have two movable lens groups. The first lens group is generally used for magnification purposes and the second lens group is used for focus correction. The distance between the two lens groups from the film surface is adjusted to achieve the zooming effect. The group 1 lens element is used for focal length adjustment. The group 2 lens element is used for focus correction, and is positioned between the group 1 lens element and the film surface. To achieve the zooming effect, the group 1 lens element is moved farther away from the film surface by a distance X. For refocusing the image onto the film, the group 2 lens element is also moved farther away from the film surface by a distance Y. To achieve proper focus, distance Y is larger than distance X, the exact relationship being readily derived from well known optics principles such as Snell's law. In order to maintain the ratio between distances X and Y, many different cam and gear mechanisms have been designed in the art. Some conventional cameras provide a cam mechanism having a cam barrel with two independent helicoid cam grooves with different gradients for the movement of the two lens groups. The first cam groove is used for moving the first lens group, while the second cam grove is used for moving the second lens group. Since the distance Y is greater than X, the gradient (defined as the angle formed between the traverse-sectional edge of the groove barrel and the groove) for the second groove is larger (steeper) than the first groove. The steeper gradient results in poor accuracy and less reliable mechanical movement for the group 2 lens element. There is therefore a need to provide an improved lens movement mechanism for zoom lenses.

SUMMARY OF INVENTION

Accordingly, the present invention provides a zoom lens assembly that couples the second lens group to the first lens group such that one cam mechanism is able to transfer both lens groups. The second lens group is further provided with a second cam mechanism that is able to provide the fine distance adjustment of the second lens group required for proper focus correction.

The zoom lens assembly according to the present invention contains a first lens group with a first lens defining an optical axis. A first cam mechanism, adapted for mounting onto a camera, is coupled to the first lens group for moving the first lens group along the optical axis. A second lens is provide within the second lens group and has an optical axis that is aligned with the optical axis of the first lens. The second lens group is coupled to the first cam mechanism such that moving the first lens group along the optical axis by operating the first cam mechanism translates into a movement of the second lens group. In addition, a second cam mechanism is used to further couple the first cam mechanism and the second lens group such that operating the first cam mechanism causes an additional movement of the second lens group along the same optical axis.

In the preferred embodiment, the first lens group is attached inside a first cam barrel such that the optical axis coincide with the longitudinal axis of the first cam barrel. A rotary barrel, adapted for rotatable attachment onto the mount opening of a camera, is slidably fitted over the first cam barrel and is provided with a cam drive to slidably engage a helicoid cam groove cut on the first cam barrel.

In the preferred embodiment, the second lens group is fitted within a second cam barrel which contains one or more helicoid channels and one or more longitudinal channels. The second lens group is also attached to the first cam barrel in a manner such that there is no rotational movement of the second lens group relative to the first cam barrel. The cam drive engages to the longitudinal channel such that rotating the rotary barrel causes a corresponding rotation of a second cam barrel. At least one second cam drive is mounted on the second lens group and interacts slidably with the helicoid channel such that the rotational twist of the rotary barrel by the user is translated into additional longitudinal movement of the second lens group.

An important result of this combination cam mechanism is that the helicoid channel that is cut into the second cam barrel does not need to have a steep gradient, because the purpose of the helicoid channel is only for the fine positioning required for focus correction of the second lens group. The larger travelling distance that is required for focal length adjustment for both lens groups is rendered by the helicoid groove of the first cam barrel. As a result, the helicoid channel has a shallow gradient that gives greater stability and the reliability.

DETAILED DESCRIPTION

In the description and the accompanying claims, the terms "comprising", "including" and "containing" are meant to be open-ended in their meaning, and should be interpreted to have the meaning "but not limited to . . . ". The word "coupling" refers to a direct mechanical coupling or an indirect mechanical coupling via a mechanical connection or an intermediate device. Also, certain elements or parts understood to be components of the zoom lens assembly have been left out of the drawings in order not to obscure the present invention. For example, each lens group may contain a plurality of lens which may be attached to different positions along the optical axis. Different zoom lens designs may contain different number of lens in each lens group. Thus the exact positioning of the various lenses may vary. It is understood that a description of the movement of a particular lens group refers to the movement of all lenses belonging to the same lens group.

Figure 1:
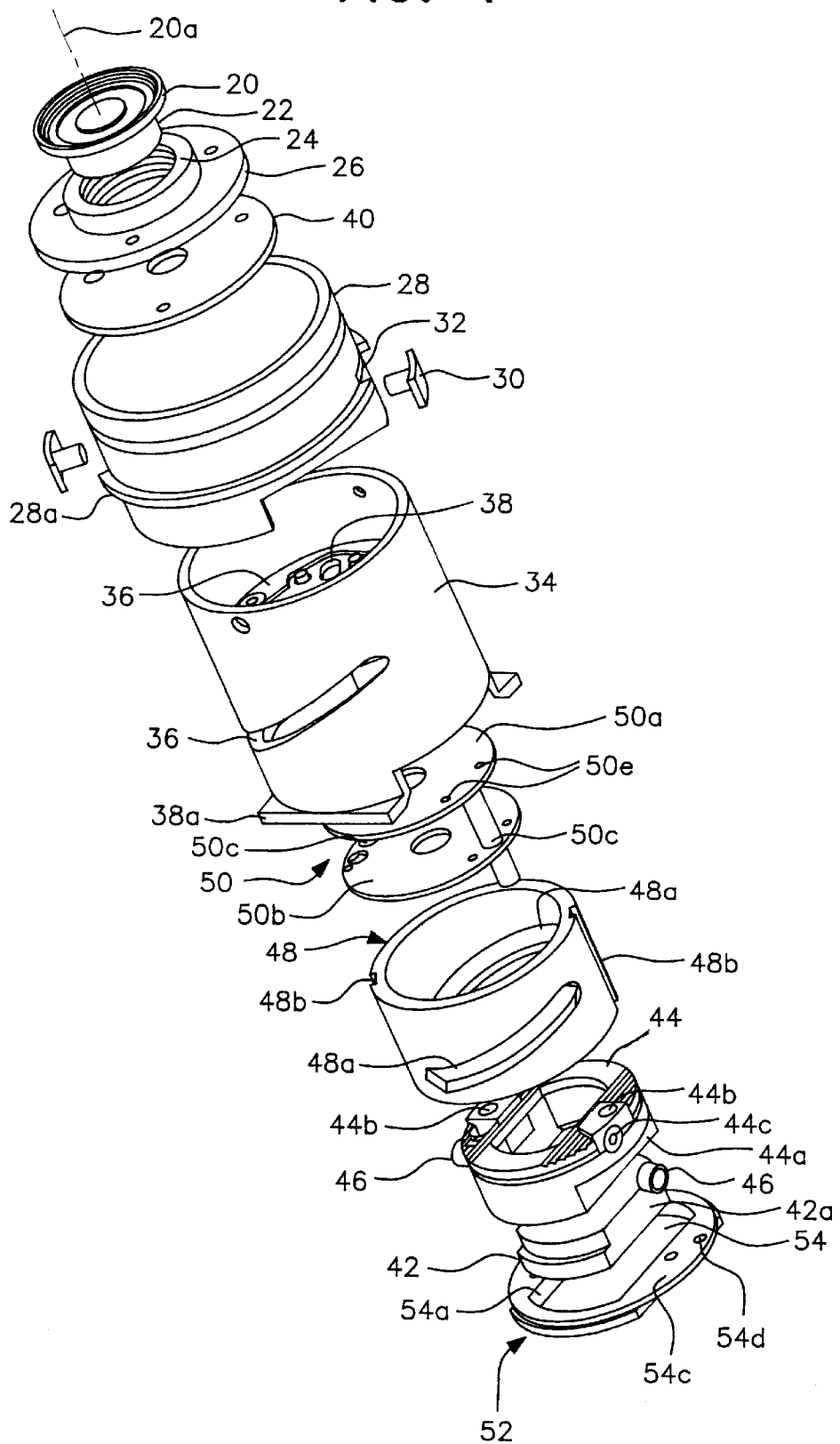
FIG. 1 is the exploded perspective view of the zoom mechanism assembly according to one embodiment of the present invention.

Referring first to FIG. 1, the preferred embodiment of the present invention contains a first lens element 20 having an optical axis 20a and a neck 22 for mounting onto the collar 24 of a first lens plate 26. For ease of explanation, those parts are generally referred to as the first lens group.

The first cam mechanism includes a cylindrical rotary barrel 28 with two cam pins 30 mounted thereon and extending radially inward through two side holes 32. In the most preferred embodiment, the outer surface or the rotary barrel 28 is also provided with circumferential ribs 28a for engagement onto the mount hole of a camera. The first cam mechanism also includes a cylindrical first cam barrel 34 having a pair of opposing helicoid cam grooves 36 cut through the cylindrical structure. Within the first cam barrel is a cross plate 38 provided with screw holes for attachment of the first lens group via the first attachment plate 40. Flanges 38a extend from the film end of the barrel for interaction with the interior of the camera.

The second lens group contains a second lens element 42 that contains the focus correction lenses. The second lens element 42 has a non-circular shape and, in the preferred embodiment, contains two opposing flat sides 42a. Lens frame 44 has an internal opening having the same non-circular shape as the second lens element with two flat sides 44a and is adapted to receive the second lens element therein. The exterior of lens frame 44 also retains two flat sides 44a. Lens frame 44 is also provided with smooth holes 44b on the periphery and running parallel to the optical axis. Another set of radially extending screw holes 44c are provided for mounting of two second cam barrel pins 46.

The second cam mechanism includes a cylindrical second cam barrel 48 that is adapted for telescopic fitting over lens frame 44. In the preferred embodiment, second cam barrel 48 contains two helicoid channels 48a cut through the cylindrical wall, and two longitudinal channels 48b providing two recesses on the outer wall of the barrel parallel to the optical axis. In the preferred embodiment, a second attachment plate 50 is provided and contains two circular plates 50a and 50b, and two hollow lens guard rods 50c. The first circular plate is the lens guard rod holder and contains a central opening along the optical axis and screw holes 50e along the periphery for mounting onto cross plate 38 of the first cam barrel. The second circular plate 50b also contains a central opening along the optical axis. Another lens (not shown) is fixed between plates 50a and 50b and is a constituent part of the first lens group. The hollow lens guard rod 50c has internal threads at the open end. Positioning frame 52 in the preferred embodiment is disk-shaped, with a circular outer edge and a cavity 54 therein. Cavity 54 contains two opposing flat sides 54a and has a shape corresponding to that of the second lens element. Two through holes 54d are also provided.

The first lens group is assembled by screwing the threaded neck 22 of the first lens element 20 into collar 24 of the first lens plate 26. The first lens group couples to the first cam mechanism by a screw attachment of the first lens plate 26 to the cross plate 38 of the first cam barrel 34 with the first lens attachment plate 40 inserted therebetween. The second lens element 42 fits within lens frame 44, which is in turn fitted within the second lens barrel 48. The two second cam barrel pins 46 are screwed into radiating screw holes 44c and extend radially outwards to engage helicoid channel 48a.

Figure 2:
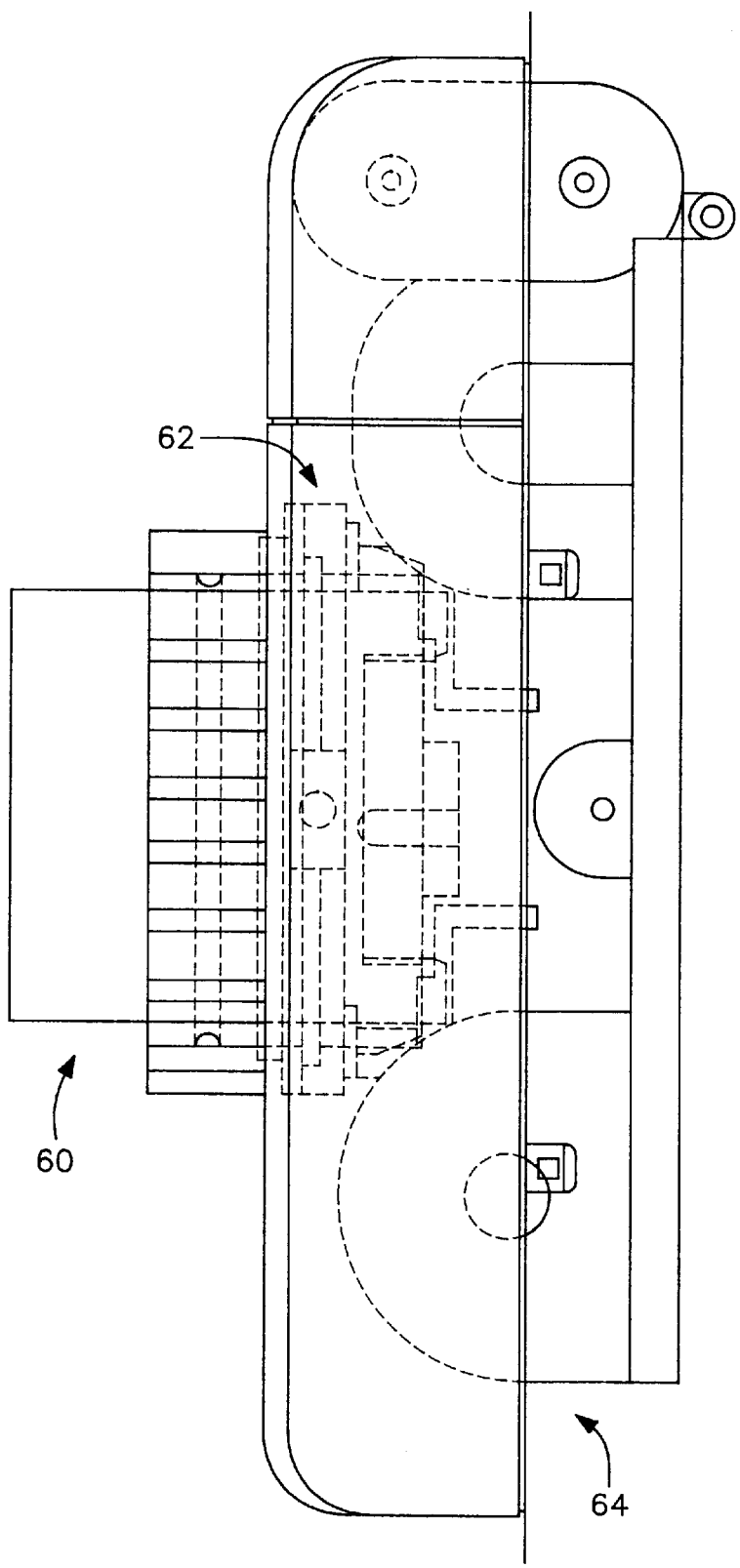
FIG. 2 is the side view of the present zoom lens assembly fitted with a camera.
Figure 3A:
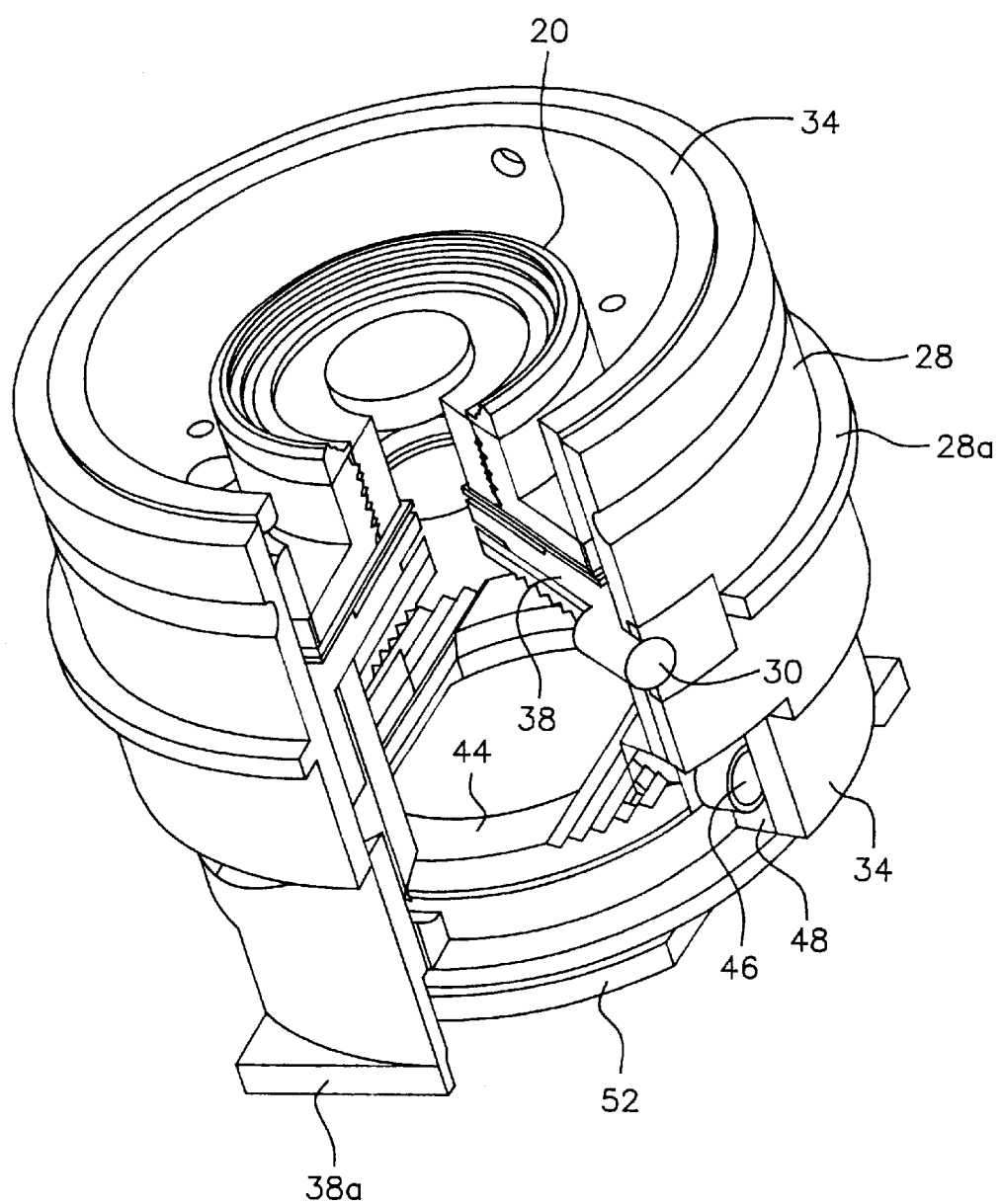
FIG. 3A is the top perspective view of the assembled zoom assembly of FIG. 1 in the wide-angle position with a section cut-away to illustrate the relative positions of the various parts.
Figure 3B:
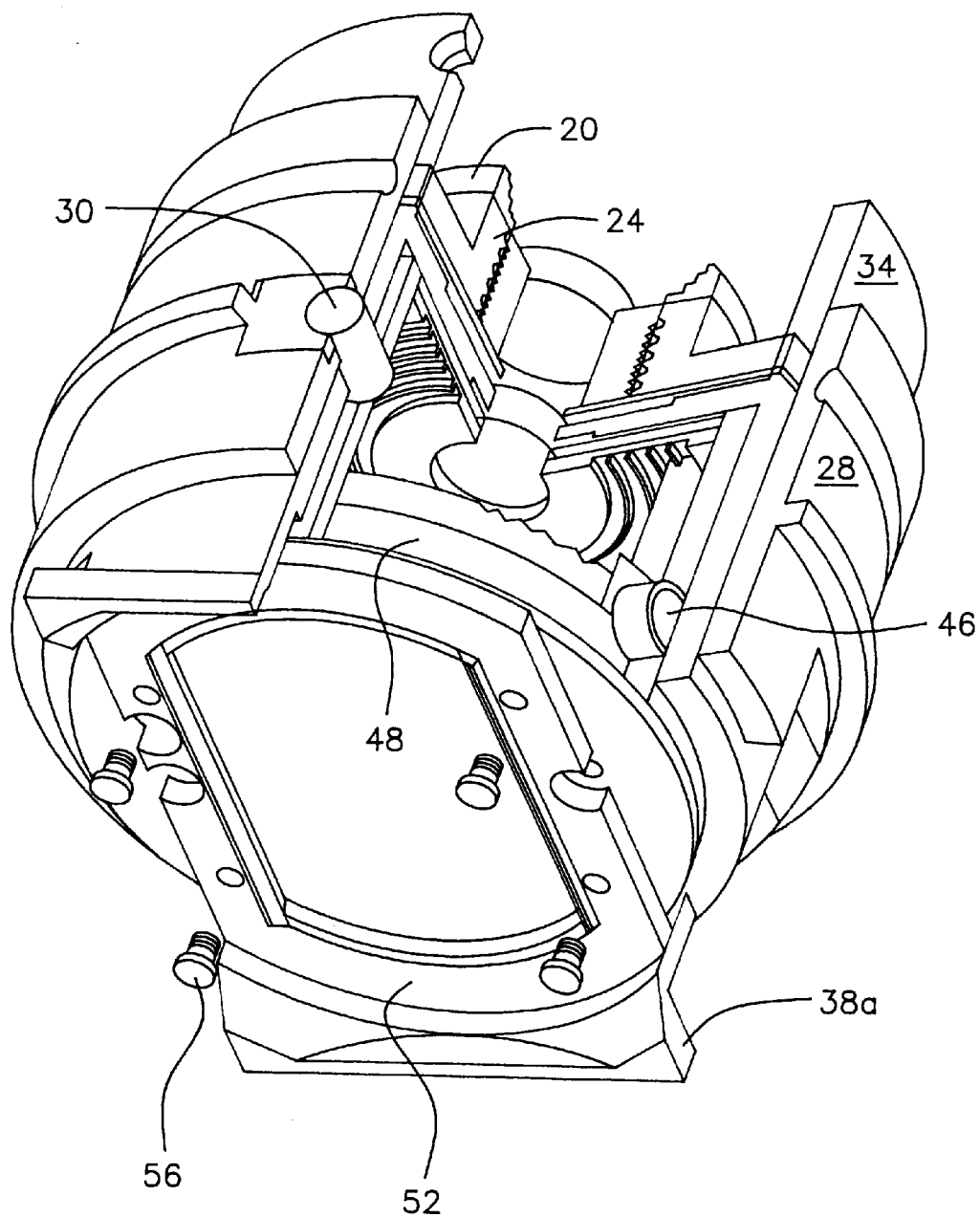
FIG. 3B is the bottom perspective view of the assembled zoom assembly of FIG. 1 in the wide-angle position with a section cut-away to illustrate the relative positions of the various parts.
Figure 4A:
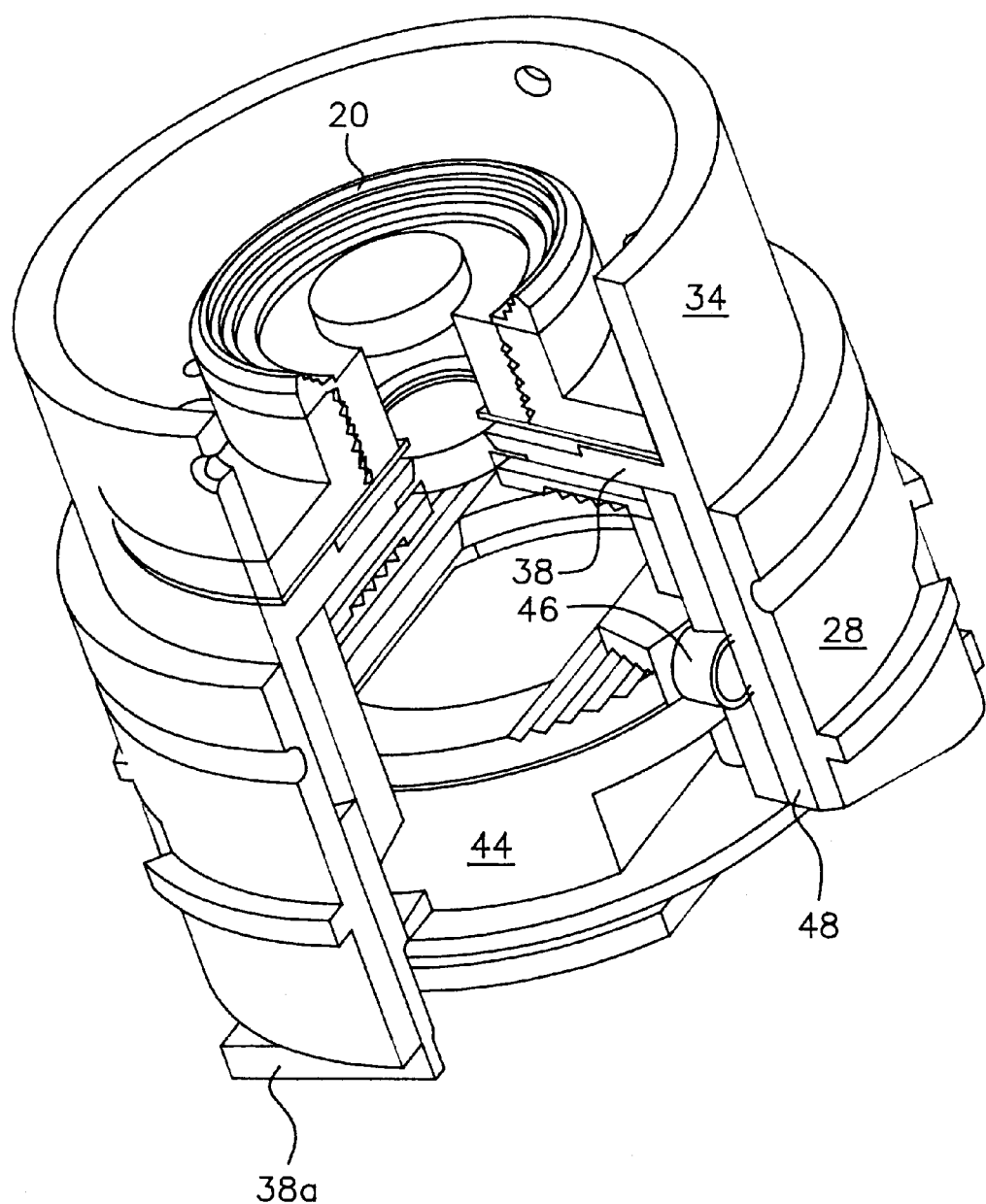
FIG. 4A is the top perspective view of the same cut-away assembly as FIG. 1, but with the zoom mechanism in the fully extended position.
Figure 4B:
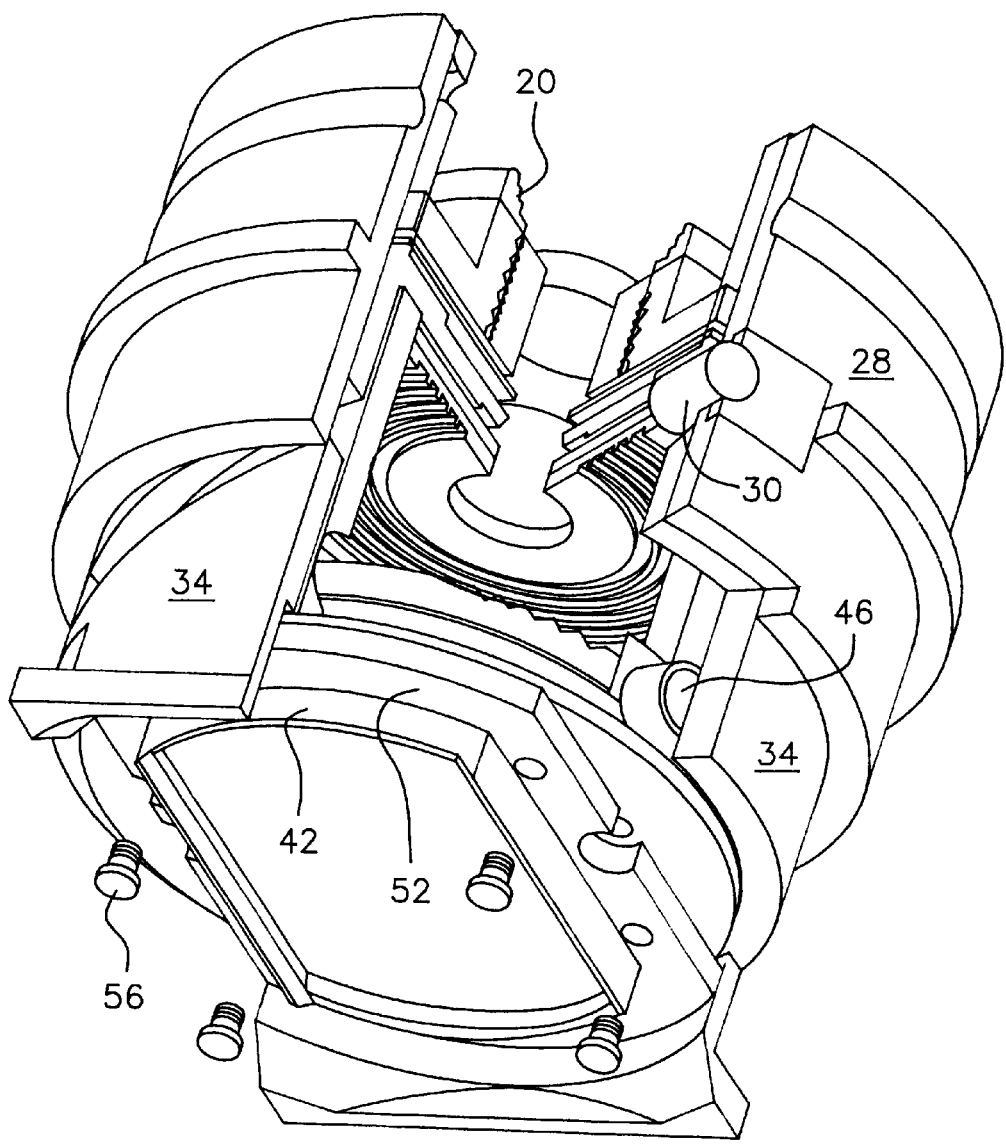
FIG. 4B is the bottom perspective view of the same cut-away assembly as FIG. 1, but with the zoom mechanism in the fully extended position.

The second attachment plate 50 is screwed onto 38 and is also adapted to also fits within the second lens barrel 48 with the guard rods 50c extending longitudinally therethrough. The two guard rods mate with holes 44b and through holes 54d to lock lens frame 44 within positioning frame 52 by a screw 56 thereon. The second attachment plate 50 is mounted onto cross plate 38 in the first cam barrel 34. Referring now to FIG. 2, the entire assembly 60 fits into the mounting hole 62 of a camera 64 with flange 38a of the first cam barrel 34 engaging mounting hole 62.

Referring also to FIGS. 3A and 3B and FIGS. 4A and 4B, the zoom lens assembly in the wide-angle position has the two lens groups in the fully retracted position along the optical axis such that distance between the two lenses is shortest. When a user wants to zoom onto a distant object, he can grip and twist the exterior of rotary barrel 28, which is free to rotate within the camera mount hole. Ribs 28a engage the rotary barrel 28 to the camera and prevent any movement along the optical axis relative to the camera. The rotating action causes the cam pins 30 to act as the cam drive to transfer the first cam barrel 34 outwards away from and inwards towards the film surface of the camera by sliding along cam groove 36. Since both the first and second lens groups are coupled to the first cam barrel 34, both groups of lenses are transferred therealong. The cam pins, however, are also engaged within the longitudinal channels 48b of the second cam barrel 48. Thus, the twisting action of the user on the rotary barrel also causes the rotation of the second cam barrel. Since lens frame 44 is coupled to the non-rotating second attachment plate 50, via rods 50c, the second lens group is prevented from rotating concomitantly. The second lens group, however, is also coupled to the rotating second cam barrel by engagement of the second cam pins to the helicoid channel 48a. Thus, the rotation of the second cam barrel causes the second lens group to slide longitudinally within the helicoid channel and along the guard rod, translating the rotational movement into additional longitudinal movement of the second lens group. The second lens group is also free to slide longitudinally through cavity 54. In the same manner, twisting in the reverse direction causes a retraction of the second lens group for different distances. Thus, rotation of second cam barrel 48 enhances additional movement of lens group 2 initiated by pin 46. As helicoid channel 48a is only used for the additional movement, its gradient is less than that in a conventional design.

While the present invention has been described particularly with references to the aforementioned figures with emphasis on cam barrels containing grooves cut therein, it should be understood that the figures are for illustration only and should not be taken as limitation on the invention. It is contemplated that many changes and modifications may be made by one of ordinary skilled in the art without departing from the spirit and the scope of the invention described. For example, although drive pins, and helicoid and longitudinal grooves are described in the preferred embodiment, other types of drive mechanisms may also be used to serve the same function such as gears and gear drives.

What is claimed is:

1. A zoom lens assembly comprising:
    a first lens group including at least one first lens defining an optical axis;
    a first cam mechanism for mounting onto a camera and coupled to said first lens group for moving said first lens group along said optical axis relative to the film surface of said camera;
    a second lens group including at least one second lens having a second optical axis aligned along said optical axis, said second lens group further coupled to said first cam mechanism such that moving said first lens group along said optical axis by operating said first cam mechanism translates into a longitudinal movement of said second lens group along said optical axis;

a second cam mechanism coupling said first cam mechanism and said second lens group such that operating said first cam mechanism causes an additional movement of said second lens group along said optical axis; and said first cam includes a first cam barrel with at least one helicoid cam groove, said first lens group attached inside said first cam barrel such that said optical axis coincide with the longitudinal axis of said first cam barrel; and a rotary barrel adapted for rotatable attachment onto the mount hole of said camera, said rotary barrel further slidably fitted over said cam barrel and provided with a cam drive slidably engaging said cam groove.

2. The zoom lens assembly according to claim 1, wherein said second lens group is attached to said first cam barrel such that no independent rotational movement of the second lens group is allowed.

3. The zoom lens assembly according to claim 2, wherein said second lens mechanism comprises:

a second cam barrel slidably fitted over said second lens group such that said optical axis coincide with the longitudinal axis of said second cam barrel, said second cam barrel provided with at least one helicoid channel and at least one longitudinal channel, said cam drive engaged to said longitudinal channel such that rotating said rotary barrel causes a corresponding rotation of said second cam barrel; and a second cam drive mounted on said second lens group for sliding engagement along said heloicoid channel such that the rotational movement of said rotary barrel is translated into additional longitudinal movement of said second lens group along said optical axis.

4. The zoom lens assembly according to claim 3, wherein said second cam drive comprises at least one second cam barrel pin attached to said second lens group and projecting radially outward therefrom and extending through said helicoid channel.

5. The zoom lens assembly according to claim 3, wherein said cam drive comprises at least one cam pin mounted onto said rotary barrel and extending radially inward therefrom said cam pin further extending through said helicoid cam groove to engage said longitudinal channel.

\* \* \* \* \*